United States Patent
Greci

(10) Patent No.: US 9,091,147 B2
(45) Date of Patent: Jul. 28, 2015

(54) DOWNHOLE FLUID FLOW CONTROL SYSTEM HAVING TEMPORARY SEALING SUBSTANCE AND METHOD FOR USE THEREOF

(75) Inventor: Stephen Michael Greci, McKinney, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 86 days.

(21) Appl. No.: 13/584,240

(22) Filed: Aug. 13, 2012

(65) Prior Publication Data
US 2013/0161024 A1  Jun. 27, 2013

(51) Int. Cl.
E03B 3/18 (2006.01)
E21B 43/08 (2006.01)
E21B 43/10 (2006.01)
C09K 8/508 (2006.01)
C09K 8/575 (2006.01)

(52) U.S. Cl.
CPC ................ *E21B 43/08* (2013.01); *C09K 8/508* (2013.01); *C09K 8/5751* (2013.01); *E21B 43/10* (2013.01)

(58) Field of Classification Search
USPC ......... 166/376, 277, 296, 316, 233, 275, 278, 166/317
See application file for complete search history.

(56) References Cited

U.S. PATENT DOCUMENTS

| 7,204,316 | B2 | 4/2007 | Dusterhoft et al. |
| 2005/0155772 | A1* | 7/2005 | Dusterhoft et al. ........... 166/381 |
| 2007/0225175 | A1 | 9/2007 | Cooke |
| 2008/0115932 | A1 | 5/2008 | Cooke |
| 2009/0107684 | A1 | 4/2009 | Cooke, Jr. |
| 2009/0301726 | A1 | 12/2009 | Coronado |
| 2011/0186300 | A1* | 8/2011 | Dykstra et al. ................ 166/316 |

OTHER PUBLICATIONS

International Search Report and Written Opinion, PCT/US2011/066450, KIPO (Aug. 1, 2012).

* cited by examiner

*Primary Examiner* — Cathleen Hutchins
*Assistant Examiner* — Taras P Bemko

(57) ABSTRACT

A downhole fluid flow control system (100). The downhole fluid flow control system (100) includes a flow control component (122) having an internal flow path (134) and a temporary sealing substance (136) disposed within the internal flow path (134). During installation of the downhole fluid flow control system (100) in a well, the temporary sealing substance (136) prevents fluid flow through the flow control component (122), which prevents plugging or clogging of the internal flow path (134). After installation, the temporary sealing substance (136) degrades when exposed to a water source in the well, which enables fluid flow through the flow control component (122) and thus proper operation of the fluid flow control system (100).

11 Claims, 6 Drawing Sheets

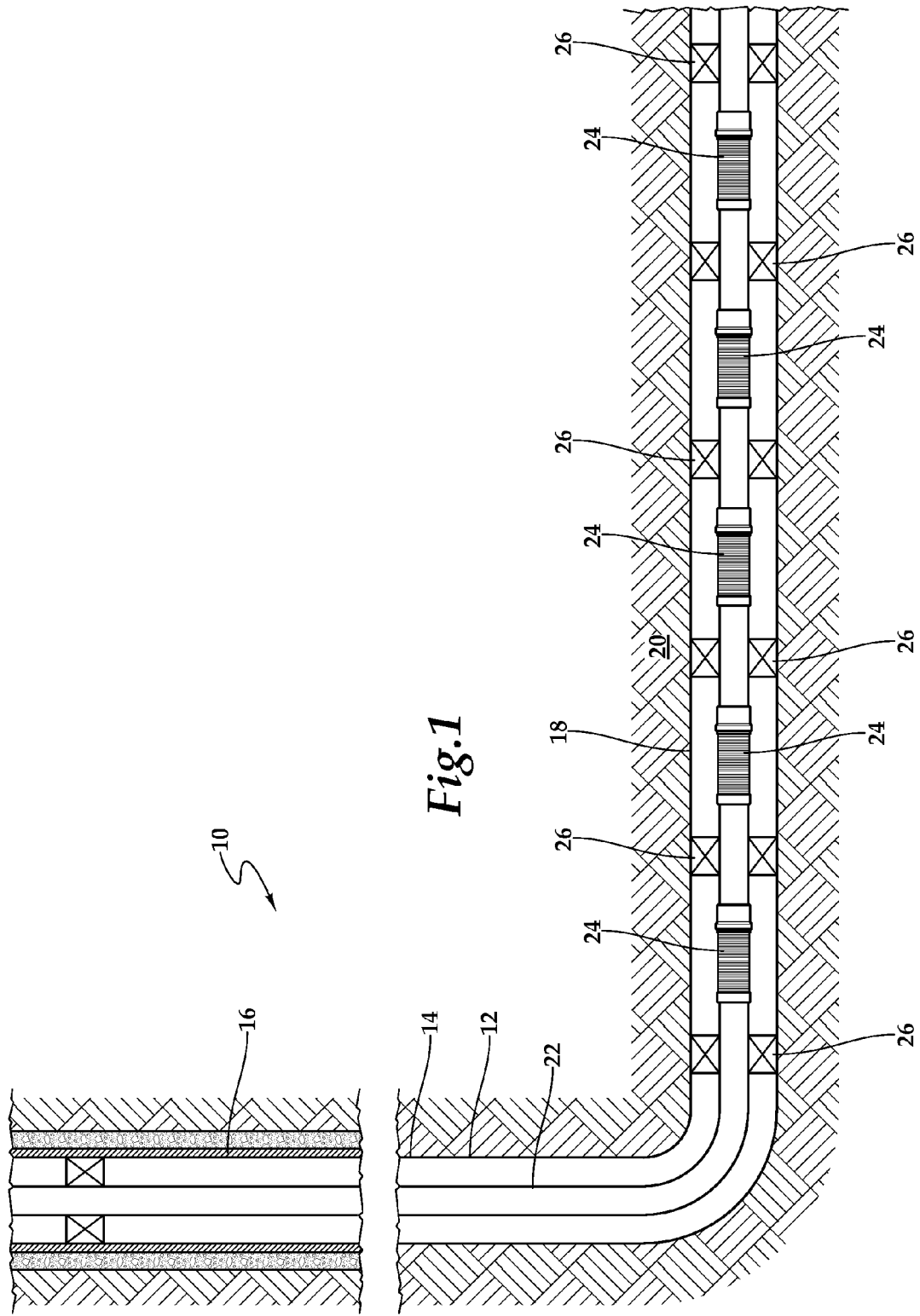

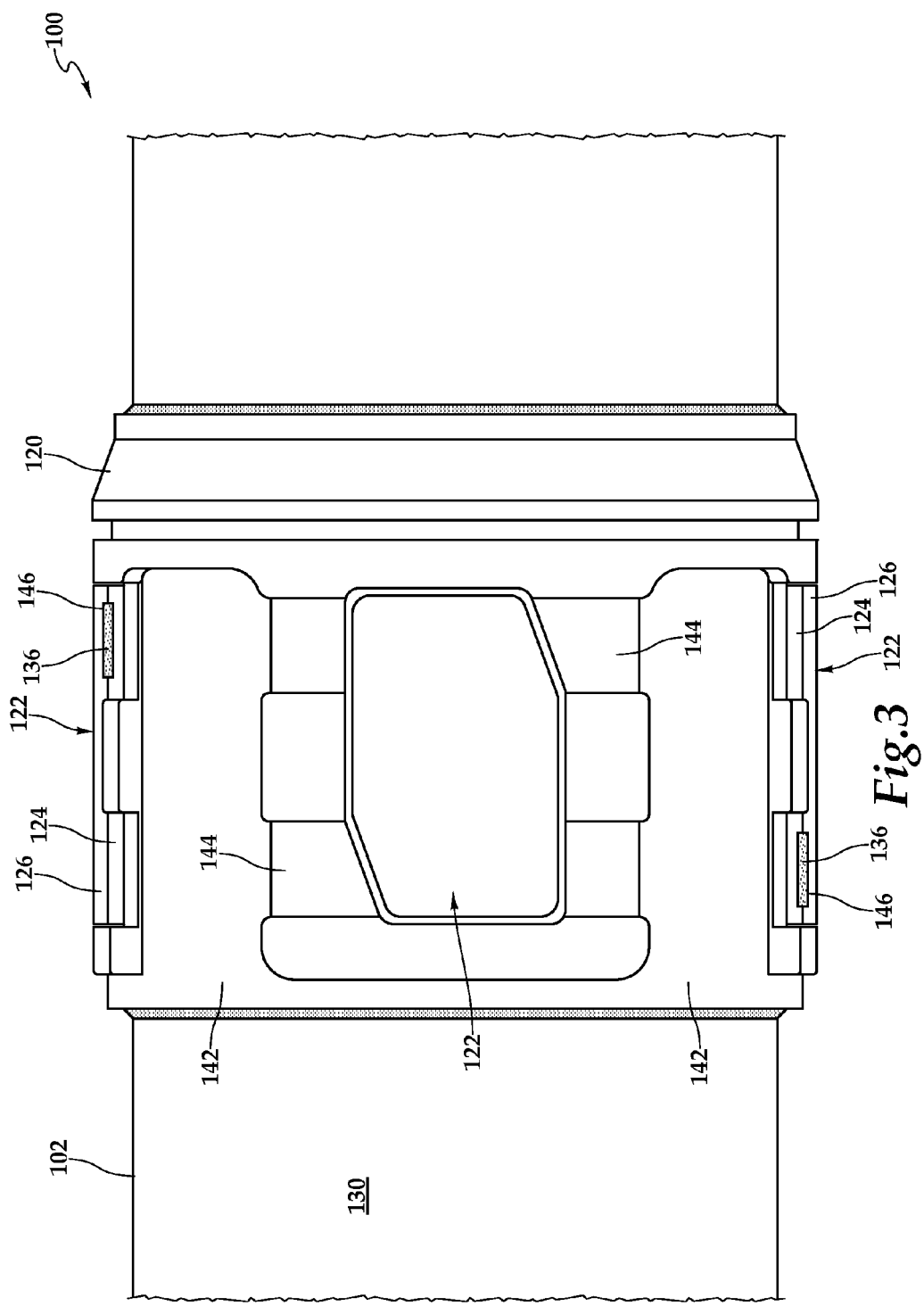

DOWNHOLE FLUID FLOW CONTROL SYSTEM HAVING TEMPORARY SEALING SUBSTANCE AND METHOD FOR USE THEREOF

CROSS-REFERENCE TO RELATED APPLICATIONS

This application claims the benefit under 35 U.S.C. §119 of the filing date of International Application No. PCT/US2011/066450, filed Dec. 21, 2011. The entire disclosure of this prior application is incorporated herein by this reference.

TECHNICAL FIELD OF THE INVENTION

This invention relates, in general, to equipment utilized in conjunction with operations performed in subterranean wells and, in particular, to a downhole fluid flow control system having a temporary sealing substance and method for use thereof.

BACKGROUND OF THE INVENTION

Without limiting the scope of the present invention, its background will be described with reference to producing fluid from a hydrocarbon bearing subterranean formation, as an example.

During the completion of a well that traverses a hydrocarbon bearing subterranean formation, production tubing and various completion equipment are installed in the well to enable safe and efficient production of the formation fluids. For example, to prevent the production of particulate material from an unconsolidated or loosely consolidated subterranean formation, certain completions include one or more sand control screen assemblies positioned proximate the desired production interval or intervals. In other completions, to control the flow of production fluids into the production tubing or the flow of injection fluids out of the production tubing, it is common practice to install one or more flow control devices within the tubing string.

More recently, attempts have been made to utilize fluid flow control devices within completions requiring sand control. For example, in certain sand control screens, after production fluids flow through the filter medium, the fluids are directed into a flow control section. The flow control section may include one or more flow control components such as flow tubes, nozzles, labyrinths or the like. Typically, the production flowrate through these flow control screens is fixed prior to installation by the number and design of the flow control components. It has been found, however, that during the installation of such flow control screens, the flow control components may become plugged or clogged due to the presence of drilling mud or other fluids or debris in the wellbore. If such a plugging agent becomes stuck in a flow control component of a flow control screen, the flow control ability of that flow control component may be compromised. In addition, if such plugging agents become stuck in numerous flow control components of a flow control screen, the entire screen joint may be unusable.

Accordingly, a need has arisen for a downhole fluid flow control system that is operable to control the inflow of formation fluids and/or the outflow of injection fluids. In addition, a need has arisen for such a downhole fluid flow control system that may be incorporated into a flow control screen. Further, a need has arisen for such a downhole fluid flow control system that is not susceptible to becoming plugged or clogged during installation.

SUMMARY OF THE INVENTION

The present invention disclosed herein comprises a downhole fluid flow control system for controlling the inflow of formation fluids and/or the outflow of injection fluids. In addition, the downhole fluid flow control system of the present invention is operable to be incorporated into a flow control screen. Further, the downhole fluid flow control system of the present invention is not susceptible to becoming plugged or clogged during installation.

In one aspect, the present invention is directed to a downhole fluid flow control system. The downhole fluid flow control system includes a flow control component having an internal flow path. A temporary sealing substance is disposed within the internal flow path. The temporary sealing substance prevents fluid flow through the flow control component.

In one embodiment, the temporary sealing substance is a degradable polymer such as polysaccharide, chitin, chitosan, protein, aliphatic polyester, poly(lactide), poly(glycolide), poly($\epsilon$-caprolactone), poly(hydroxybutyrate), poly(anhydride), aliphatic polycarbonate, poly(orthoester), poly(amino acid), poly(ethylene oxide) or polyphosphazene. In another embodiment, the temporary sealing substance is poly(lactic acid), a stereoisomer of a poly(lactide) or poly(phenyllactide). In a further embodiment, the temporary sealing substance degrades when exposed to a water source in the well. For example, the water source may be a hydrated organic or inorganic compound. The water source may be present in the well prior to positioning the downhole fluid flow control system in the well or the water source may be introduced into the well after positioning the downhole fluid flow control system in the well.

In another aspect, the present invention is directed to a flow control screen. The flow control screen includes a base pipe with an internal passageway, a blank pipe section and a perforated section. A filter medium is positioned around the blank pipe section of the base pipe. A housing is positioned around the base pipe to define a fluid path between the filter medium and the internal passageway. At least one flow control component is disposed within the fluid path. The flow control component has an internal flow path. A temporary sealing substance is disposed within the internal flow path. The temporary sealing substance prevents fluid flow through the flow control component until the temporary sealing substance degrades when exposed to a water source in the well.

In a further aspect, the present invention is directed to a downhole fluid flow control method. The method includes providing the downhole fluid flow control system including a flow control component having an internal flow path with a temporary sealing substance disposed within the internal flow path to prevent fluid flow through the flow control component; positioning the downhole fluid flow control system in the well; and degrading the temporary sealing substance, thereby permitting fluid flow through the flow control component. The method may also include exposing the temporary sealing substance to water in the well to degrade the temporary sealing substance or exposing the temporary sealing substance to elevated temperature in the well to degrade the temporary sealing substance.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic illustration of a well system operating a plurality of downhole fluid flow control systems according to an embodiment of the present invention;

FIG. 3 is a top view of a downhole fluid flow control system of a flow control screen according to an embodiment of the present invention with the outer housing removed;

DETAILED DESCRIPTION OF THE INVENTION

Figure 2A:
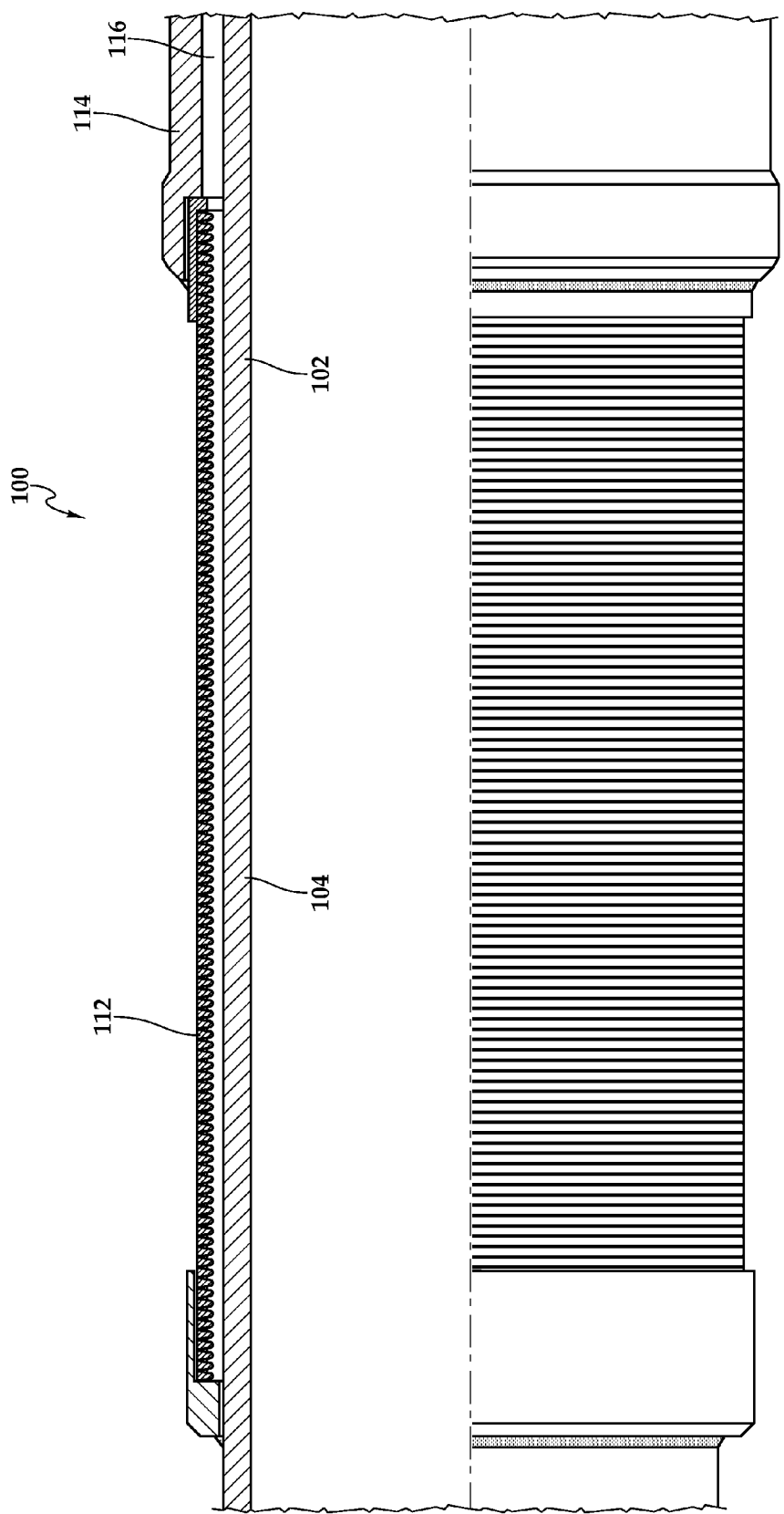
FIGS. 2A-2B are quarter sectional views of successive axial sections of a downhole fluid flow control system embodied in a flow control screen of the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIG. 1, therein is depicted a well system including a plurality of downhole fluid flow control systems embodying principles of the present invention that is schematically illustrated and generally designated 10. In the illustrated embodiment, a wellbore 12 extends through the various earth strata. Wellbore 12 has a substantially vertical section 14, the upper portion of which has cemented therein a casing string 16. Wellbore 12 also has a substantially horizontal section 18 that extends through a hydrocarbon bearing subterranean formation 20. As illustrated, substantially horizontal section 18 of wellbore 12 is open hole.

Positioned within wellbore 12 and extending from the surface is a tubing string 22. Tubing string 22 provides a conduit for formation fluids to travel from formation 20 to the surface. At its lower end, tubing string 22 is coupled to a completions string that has been installed in wellbore 12 and divides the completion interval into various production intervals adjacent to formation 20. The completion string includes a plurality of fluid flow control systems 24, each of which is positioned between a pair of packers 26 that provides a fluid seal between the completion string and wellbore 12, thereby defining the production intervals. In the illustrated embodiment, fluid flow control systems 24 serve the function of filtering particulate matter out of the production fluid stream. In addition, each fluid flow control system 24 has a flow control section that is operable to control the flow of a production fluid stream during the production phase of well operations and is also operable to control the flow of an injection fluid stream during a treatment phase of well operations.

As explained in greater detail below, the flow control sections include flow control components having internal flow paths. The internal flow paths preferably include relative narrow channels that are designed to provide the desired production and injection flow control. During run in and installation, as the completion string is lowered and moved into the desired position within wellbore 12, solid particles or other debris in the drilling mud or other wellbore fluid may typically flow through the flow control components resulting in potential plugging or clogging thereof. In the present invention, a temporary sealing substance is disposed within the internal flow paths of the flow control components which prevents fluid flow through the flow control components and therefore prevents plugging or clogging thereof.

Even though FIG. 1 depicts the fluid flow control systems of the present invention in an open hole environment, it should be understood by those skilled in the art that the present invention is equally well suited for use in cased wells. Also, even though FIG. 1 depicts one fluid flow control system in each production interval, it should be understood by those skilled in the art that any number of fluid flow control systems of the present invention may be deployed within a production interval without departing from the principles of the present invention. In addition, even though FIG. 1 depicts the fluid flow control systems of the present invention in a horizontal section of the wellbore, it should be understood by those skilled in the art that the present invention is equally well suited for use in wells having other directional configurations including vertical wells, deviated wells, slanted wells, multilateral wells and the like. Accordingly, it should be understood by those skilled in the art that the use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Figure 2B:
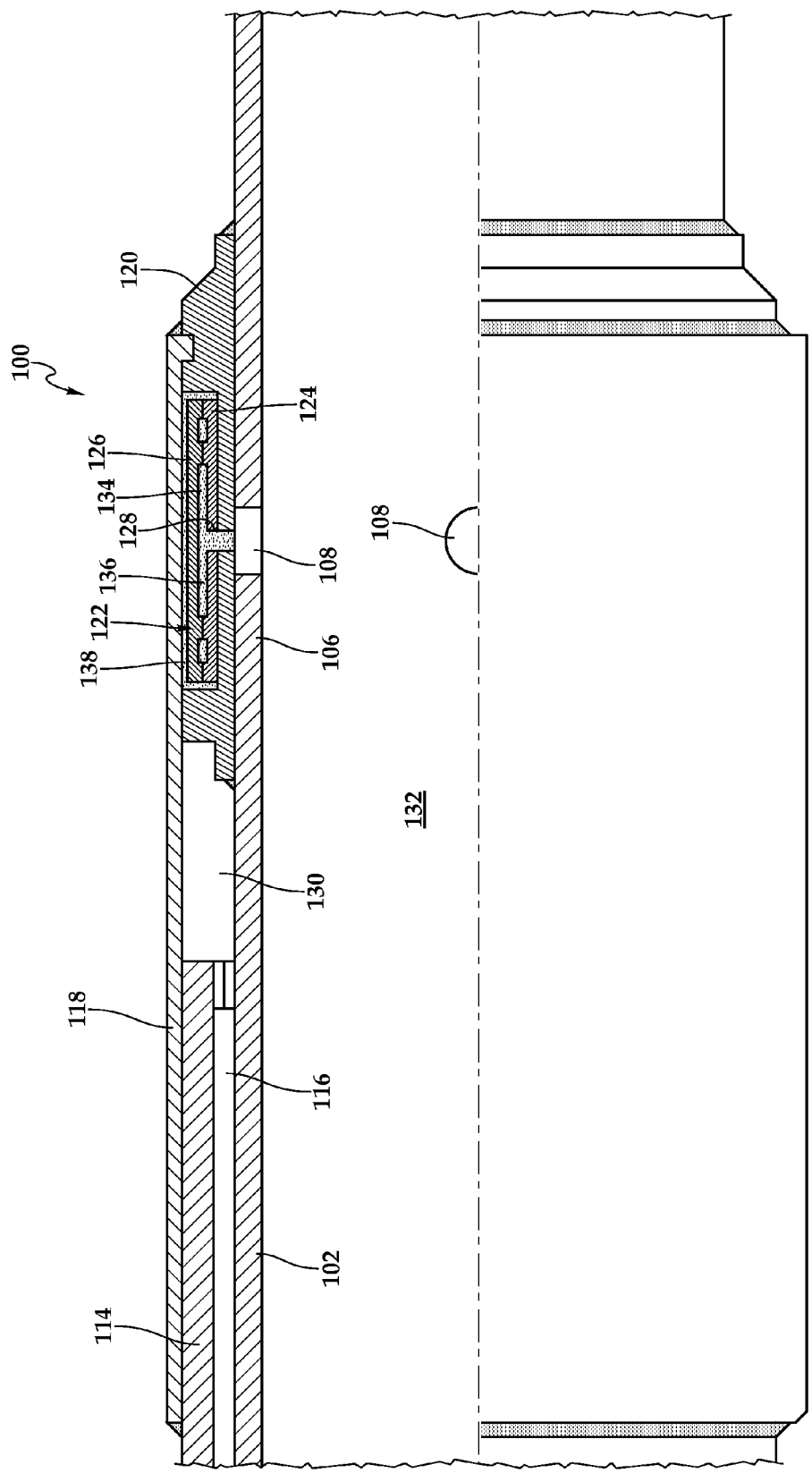

Referring next to FIGS. 2A-2B, therein is depicted successive axial sections of a fluid flow control system according to the present invention that is representatively illustrated and generally designated 100. Fluid flow control system 100 may be suitably coupled to other similar fluid flow control systems, production packers, locating nipples, production tubulars or other downhole tools to form a completion string as described above. Fluid flow control system 100 includes a base pipe 102 that has a blank pipe section 104 and a perforated section 106 including a plurality of production ports 108. Positioned around an uphole portion of blank pipe section 104 is a screen element or filter medium 112, such as a wire wrap screen, a woven wire mesh screen, a prepacked screen or the like, with or without an outer shroud positioned therearound, designed to allow fluids to flow therethrough but prevent particulate matter of a predetermined size from flowing therethrough. It will be understood, however, by those skilled in the art that the present invention does not need to have a filter medium associated therewith, accordingly, the exact design of the filter medium associated with fluid flow control system 100 is not critical to the present invention.

Positioned downhole of filter medium 112 is a screen interface housing 114 that forms an annulus 116 with base pipe 102. Securably connected to the downhole end of screen interface housing 114 is a flow control housing 118. At its downhole end, flow control housing 118 is securably connected to a support assembly 120 which is securably coupled to base pipe 102. The various connections of the components of fluid flow control system 100 may be made in any suitable fashion including welding, threading and the like as well as through the use of fasteners such as pins, set screws and the like. Even though a particular arrangement of tubular members has been described and depicted as forming fluid flow control system 100, it should be understood by those skilled in the art that other numbers and arrangements of tubular members may be used.

Positioned between support assembly 120 and flow control housing 118 are a plurality of flow control components 122, only one of which is visible in FIG. 2B. In the illustrated embodiment, flow control components 122 are circumferentially distributed about base pipe 102 at ninety degree intervals such that four flow control components 122 are provided. Even though a particular arrangement of flow control components 122 has been described and depicted, it should be understood by those skilled in the art that other numbers and arrangements of flow control components 122 may be used. For example, either a greater or lesser number of circumferentially distributed flow control components at uniform or nonuniform intervals may be used. Additionally or alternatively, flow control components 122 may be longitudinally distributed along base pipe 102.

In the illustrated embodiment, each flow control component 122 is formed from an inner flow control element 124 and an outer flow control element 126. Inner flow control element 124 has an opening 128 that is aligned with one of the openings 108 of base pipe 102. Even though a two part flow control component has been depicted and described, those skilled in the art will recognize that a flow control component of the present invention could be formed from a different number of elements both less than or greater than two including a single element design. In the illustrated embodiment, an annular region 130 is created between base pipe 102 and flow control housing 118. In addition, base pipe 102 includes an interior flow path 132. As discussed in greater detail below, formed between inner flow control element 124 and outer flow control element 126 is an internal flow path 134. Depending upon the desired flow characteristics through flow control components 122, internal flow paths 134 may include relatively narrow channels that may be susceptible to plugging or clogging with wellbore solids or debris during run in and installation of the completion string. To prevent this outcome, the present invention utilizes a temporary sealing substance 136 disposed within internal flow paths 134 to prevent fluid flow through flow control components 122 during run in and installation of the completion string. In addition, the illustrated embodiment includes temporary sealing substance 136 in the region 138 between flow control components 122 and flow control housing 118 which provides added protection to flow control components 122 prior to and during run in and installation of the completion string. Even though temporary sealing substance 136 is depicted and described as being disposed within internal flow paths 134 and gaps 138, it should be noted by those skilled in the art that temporary sealing substance 136 may also be disposed within or on filter medium 112 if desired to temporarily prevent fluid flow therethrough or within base pipe 102 or both.

Referring next to FIG. 3, a flow control section of fluid flow control system 100 is representatively illustrated. In the illustrated section, a support assembly 120 is securably coupled to base pipe 102. Support assembly 120 is operable to receive and support four flow control components 122. The illustrated flow control components 122 are each formed from an inner flow control element 124 and an outer flow control element 126 forming a fluid flow path 134 therebetween (see FIG. 2B). Support assembly 120 is positioned about base pipe 102 such that openings 128 will be circumferentially and longitudinally aligned with openings 108 of base pipe 102 (see FIG. 2B). Support assembly 120 includes a plurality of channels for directing fluid flow between flow control components 122 and annular region 130. Specifically, support assembly 120 includes a plurality of longitudinal channels 142 and a plurality of circumferential channels 144. Together, longitudinal channels 142 and circumferential channels 144 provide a pathway for fluid flow between fluid ports 146 of flow control components 122 and annular region 130.

Figure 4:
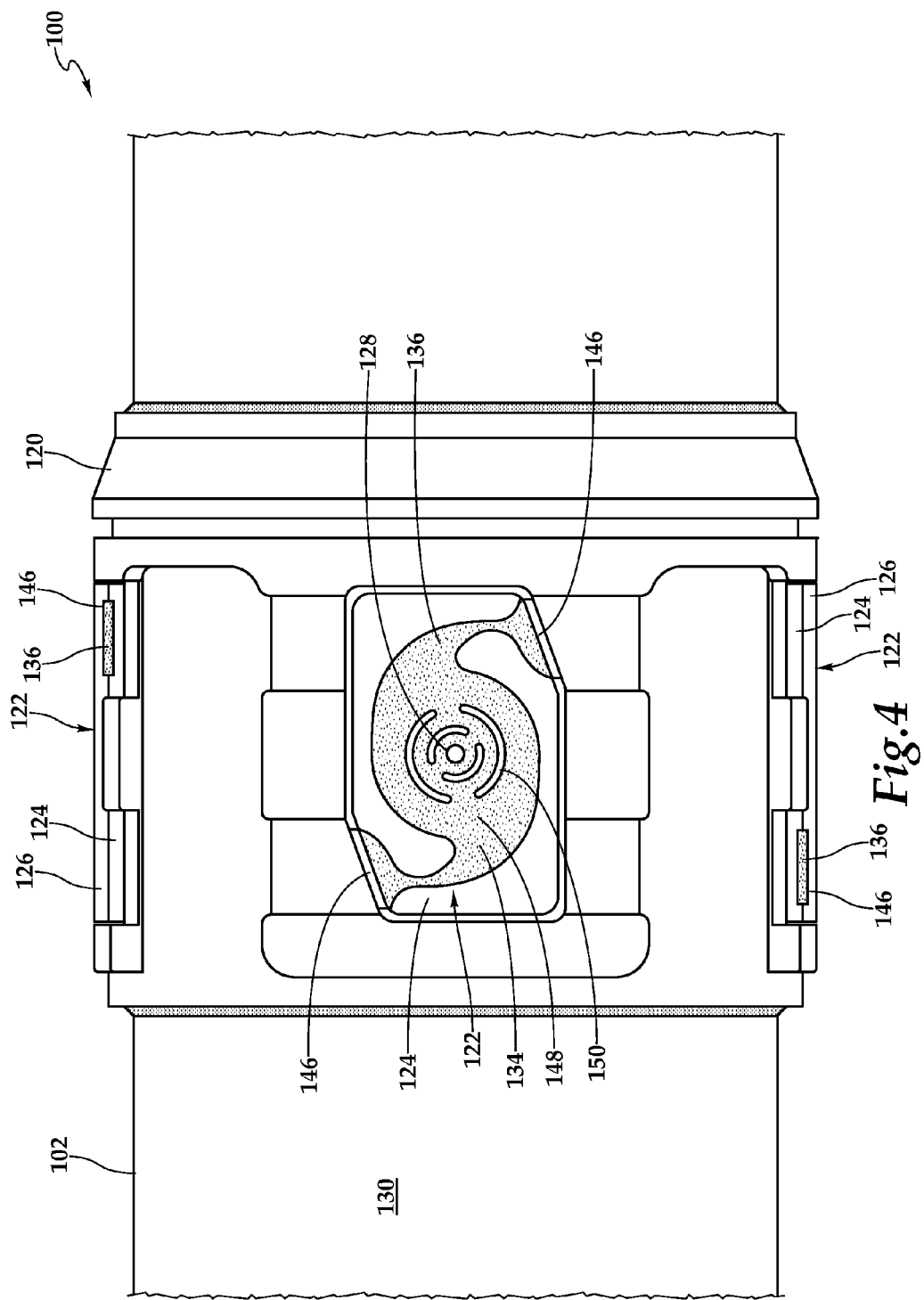
FIG. 4 is a top view of a downhole fluid flow control system according to an embodiment of the present invention depicted in an installation configuration with an outer element of a flow control component removed.

Referring next to FIG. 4, a flow control section of fluid flow control system 100 is representatively illustrated during an installation phase of well operations. In the illustrated example, the outer flow control element has been removed from one of the flow control components 122 to aid in the description of the present invention. As illustrated, flow control components 122 are each formed from an inner flow control element 124 and an outer flow control element 126. Flow control components 122 each have a fluid flow path 134 including a pair of fluid ports 146, a vortex chamber 148 and an opening 128. In addition, flow control components 122 have a plurality of fluid guides 150 in vortex chambers 148. Also disposed within vortex chambers 148 is temporary sealing substance 136 that may be injected into flow control components 122 in a liquid or slurry state then allowed to harden into a solid that fills vortex chambers 148. During run in and installation of the completion string including fluid flow control system 100, temporary sealing substance 136 blocks fluid flow through flow control components 122.

After installation of the completion string including fluid flow control system 100, temporary sealing substance 136 is degraded when exposed to the subterranean well environment. For example, temporary sealing substance 136 may degrade when exposed to water at an elevated temperature in the well. In one embodiment, temporary sealing substance 136 is a degradable polymer, such as one or more of polysaccharide, chitin, chitosan, protein, aliphatic polyester, poly (actide), poly(glycolide), poly(ε-caprolactone), poly(hydroxybutyrate), poly(anhydride), aliphatic polycarbonate, poly(orthoester), poly(amino acid), poly(ethylene oxide), or polyphosphazene. Temporary sealing substance 136 may include a plasticizer, poly(lactic acid), a poly(lactide) or poly (phenyllactide).

Temporary sealing substance 136 may degrade in the presence of a hydrated organic or inorganic compound solid, which may be carried with fluid flow control system 100 or as part of the completion string, so that a source of water is available in the well after installation. For example, the hydrated organic or inorganic compound could be provided in or carried by filter medium 112. Alternatively, a water source, such as an aqueous solution, may be delivered to temporary sealing substance 136 after installation via the interior of the completion string. As another alternative, a water source already in the well such as in the drilling mud or other wellbore fluid or formation water may be used to degrade temporary sealing substance 136.

Figure 5:
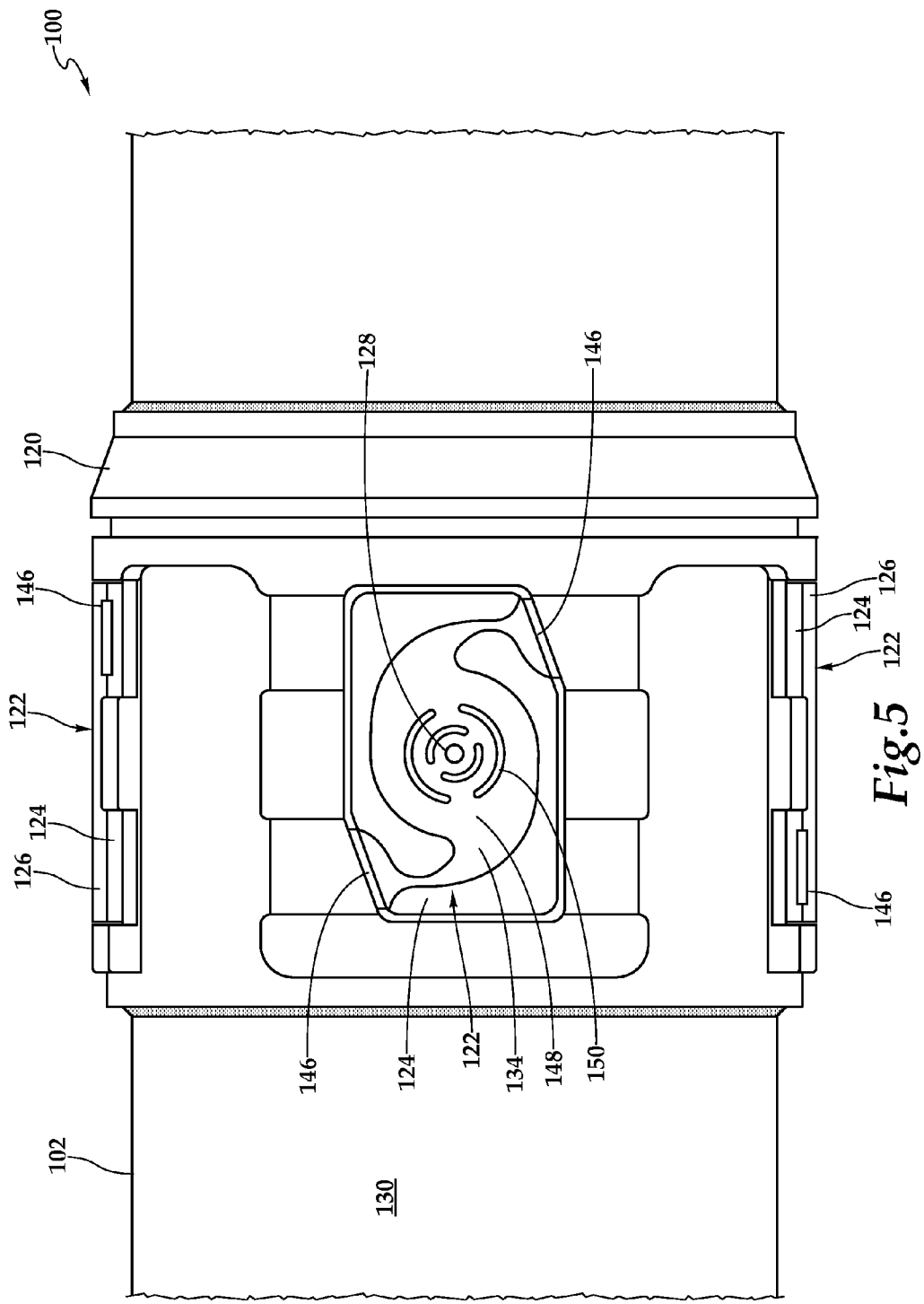
FIG. 5 is a top view of a downhole fluid flow control system according to an embodiment of the present invention depicted in an injection or production configuration with an outer element of a flow control component removed.

Once the temporary sealing substance 136 has been degraded and removed from the vortex chambers 148, as best seen in FIG. 5, flow control components 122 may perform their flow control operations. For example, during the treatment phase of well operations, a treatment fluid may be pumped downhole from the surface in the interior flow path 132 of base pipe 102 (see FIG. 2A-2B). The treatment fluid then enters the flow control components 122 through openings 128 and passes through vortex chambers 148 where the desired flow resistance is applied to the fluid flow achieving the desired pressure drop and flowrate therethrough. In the illustrated example, the treatment fluids entering vortex chamber 148 primarily travel in a radial direction within vortex chamber 148 before exiting through fluid ports 146 with little spiraling within vortex chamber 144 and without experiencing the associated frictional and centrifugal losses. Consequently, injection fluids passing through flow control components 122 encounter little resistance and pass therethrough relatively unimpeded enabling a much higher flowrate with significantly less pressure drop than in a production scenario. The fluid then travels into annular region 130 between base pipe 102 and flow control housing 118 before entering annulus 116 and passing through filter medium 112 for injection into the surrounding formation.

As another example, during the production phase of well operations, fluid flows from the formation into the production tubing through fluid flow control system 100. The production fluid, after being filtered by filter medium 112, if present, flows into annulus 116. The fluid then travels into annular region 130 between base pipe 102 and flow control housing 118 before entering the flow control section. The fluid then enters fluid ports 146 of flow control components 122 and passes through vortex chambers 148 where the desired flow resistance is applied to the fluid flow achieving the desired pressure drop and flowrate therethrough. In the illustrated example, the production fluids entering vortex chamber 148 travel primarily in a tangentially direction and will spiral around vortex chamber 148 with the aid of fluid guides 150 before eventually exiting through openings 128. Fluid spiraling around vortex chamber 148 will suffer from frictional losses. Further, the tangential velocity produces centrifugal force that impedes radial flow. Consequently, production fluids passing through flow control components 122 encounter significant resistance. Thereafter, the fluid is discharged through openings 128 to the interior flow path 132 of base pipe 102 for production to the surface. Even though a particular fluid flow path 134 through flow control components 122 has been depicted and described, those skilled in the art will recognize that the fluid flow path within a flow control component could have an alternate design based upon factors such as the desired flowrate, the desired pressure drop, the type and composition of the production fluids and the like without departing from the principles of the present invention.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A flow control screen for positioning in a subterranean well, the flow control screen comprising:
    a base pipe with an internal passageway, a blank pipe section and a perforated section;
    a filter medium positioned around the blank pipe section of the base pipe;
    a support assembly positioned around the base pipe;
    a housing positioned around the base pipe and extending between the filter medium and the support assembly to define a fluid path between the filter medium and the internal passageway;
    at least one flow control component positioned radially between the support assembly and the housing, the flow control component having at least one first port and at least one second port with a fluid chamber comprising a vortex chamber disposed therebetween, the flow control component disposed within the fluid path such that fluid traveling between the filter medium and the internal passageway must pass through the fluid chamber; and
    a temporary sealing substance disposed within the fluid chamber, the temporary sealing substance preventing fluid flow through the flow control component until the temporary sealing substance degrades when exposed to a water source in the well, thereafter permitting fluid flow through the fluid chamber of the flow control component.

2. The system as recited in claim 1 wherein the temporary sealing substance further comprises a degradable polymer.

3. The system as recited in claim 2 wherein the degradable polymer is selected from the group consisting of polysaccharide, chitin, chitosan, protein, aliphatic polyester, poly(lactide), poly(glycolide), poly(ε-caprolactone), poly(hydroxybutyrate), poly(anhydride), aliphatic polycarbonate, poly(orthoester), poly(amino acid), poly(ethylene oxide) and polyphosphazene.

4. The system as recited in claim 1 wherein the temporary sealing substance further comprises poly(lactic acid).

5. The system as recited in claim 1 wherein the temporary sealing substance further comprises a stereoisomer of a poly(lactide).

6. The system as recited in claim 1 wherein the temporary sealing substance further comprises poly(phenyllactide).

7. The system as recited in claim 1 wherein the vortex chamber further comprises a plurality of fluid guides.

8. The system as recited in claim 1 wherein the support assembly further comprises a plurality of channels to direct fluid flow to the at least one flow control component.

9. The system as recited in claim 1 wherein the at least one flow control component further comprises a plurality of flow control components positioned radially between the support assembly and the housing.

10. The system as recited in claim 1 wherein the at least one flow control component further comprises a plurality of circumferentially distributed flow control components positioned radially between the support assembly and the housing.

11. The system as recited in claim 1 wherein the temporary sealing substance is disposed radially between the at least one flow control component and the housing.

* * * * *